US006829522B1

United States Patent
Filev et al.

(10) Patent No.: US 6,829,522 B1
(45) Date of Patent: Dec. 7, 2004

(54) PORTABLE ADVISORY SYSTEM FOR BALANCING AIRFLOWS IN PAINT BOOTH

(75) Inventors: Dimitar P. Filev, Novi, MI (US); Ernest Henry Tong, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/552,710

(22) Filed: Apr. 19, 2000

(51) Int. Cl.[7] .......................... G05D 7/00; G05D 11/00
(52) U.S. Cl. .......................... 700/282; 700/32; 700/69; 700/274; 700/275; 700/279; 702/45; 454/50
(58) Field of Search .................. 700/32, 63, 65–66, 700/69, 188, 279, 59, 282, 289, 299–300, 274, 275; 702/45–49; 454/52, 50, 51

(56) References Cited

U.S. PATENT DOCUMENTS

| | | | |
|---|---|---|---|
| 3,925,650 A | 12/1975 | Brown | 702/70 |
| 4,043,181 A | 8/1977 | Nigam | 73/614 |
| 4,114,136 A | 9/1978 | D'Albora | 367/87 |
| 4,481,829 A * | 11/1984 | Shortridge | 73/861.66 |
| 4,859,865 A * | 8/1989 | Vandenburgh | 250/253 |
| 4,953,147 A | 8/1990 | Cobb | 367/35 |
| 5,038,615 A | 8/1991 | Trulson et al. | 73/597 |
| 5,043,927 A | 8/1991 | Jackson | 702/66 |
| 5,091,647 A | 2/1992 | Carduner et al. | 250/339.09 |
| 5,246,085 A * | 9/1993 | Liegel et al. | 182/118 |
| 5,341,988 A * | 8/1994 | Rein et al. | 236/49.3 |
| 5,356,334 A | 10/1994 | Gray | 454/51 |
| 5,446,333 A | 8/1995 | Ishida et al. | 310/334 |
| 5,448,503 A | 9/1995 | Morris et al. | 702/66 |
| 5,480,349 A * | 1/1996 | Kolta | 454/52 |
| 5,608,165 A | 3/1997 | Mozurkewich, Jr. | 73/599 |
| 5,634,975 A | 6/1997 | Josefsson | 118/326 |
| 5,643,077 A * | 7/1997 | Ayer | 454/54 |
| 5,820,456 A * | 10/1998 | Nelson | 454/52 |
| 5,859,537 A * | 1/1999 | Davis et al. | 324/693 |
| 5,974,886 A | 11/1999 | Carroll et al. | 73/598 |
| 6,067,059 A | 5/2000 | Chen | 345/32 |
| 6,146,264 A * | 11/2000 | Tong et al. | 454/52 |
| 6,226,568 B1 * | 5/2001 | Tong et al. | 700/277 |
| 6,262,843 B1 * | 7/2001 | Marx | 359/501 |
| 6,607,573 B1 * | 8/2003 | Chaurushia et al. | 55/356 |
| 6,613,147 B1 * | 9/2003 | Nieto | 118/326 |

FOREIGN PATENT DOCUMENTS

EP            0626519 A1      11/1994

\* cited by examiner

*Primary Examiner*—Anthony Knight
*Assistant Examiner*—Crystal J. Barnes
(74) *Attorney, Agent, or Firm*—Damian Porcari

(57) ABSTRACT

A portable advisory system for balancing airflows in a paint booth includes a portable airflow sensor to measure airflows in the paint booth, and a portable computer connected to the airflow sensor for collecting data from the airflow sensor and guiding an operator through a process of adjusting multiple fan speeds and duct dampers to achieve desired airflows.

9 Claims, 2 Drawing Sheets

PORTABLE ADVISORY SYSTEM FOR BALANCING AIRFLOWS IN PAINT BOOTH

BACKGROUND OF THE INVENTION

1. Field of the Invention

The present invention relates generally to paint booths and, more specifically, to a portable advisory system for balancing airflows in a paint booth.

2. Description of the Related Art

It is known to provide paint booths for paint applications to motor vehicles. However, in operating the paint booths, airflow balancing is one of the main issues. Properly controlled airflow has a significant impact on paint quality and paint usage through eliminating over-spray between zones in the paint booth and improving paint transfer efficiency.

One method for balancing the airflows in a paint booth that is not equipped with a system for automatic control is based on a trial-and-error approach or procedure. Cross and down flows in each zone of the paint booth are measured and appropriate adjustments of air supplies such as fans, variable fan dampers (VFDs) and damper settings are made in order to obtain some desired distribution of the airflows in the paint booth. Such an approach requires experience and good understanding about paint booth dynamics and may be tedious and time consuming.

As a result, it is desirable to provide an advisory system to measure and balance airflows in a paint booth. It is also desirable to provide a low cost system to measure and balance airflows in a paint booth that does not require extra on-line control or sensing. It is further desirable to provide a portable system to measure and balance airflows in a paint booth that is easily transported and used by a single person.

SUMMARY OF THE INVENTION

Accordingly, the present invention is a portable advisory system for balancing airflows in a paint booth. The portable advisory system includes a portable airflow sensor to measure airflows in the paint booth, and a portable computer connected to the airflow sensor for collecting data from the airflow sensor and guiding an operator through a process of adjusting multiple fan speeds and duct dampers to achieve desired airflows.

One advantage of the present invention is that a portable advisory system for balancing airflows in a paint booth is provided. Another advantage of the present invention is that the portable advisory system uses a handheld acoustic anemometer or airflow sensor to measure airflows in a paint booth that are output to a laptop/palmtop computer that collects data and guides the operator through the process of adjusting multiple fan speeds and duct dampers to achieve the desired airflows in the paint booth in a relatively short time interval without adding costly automation equipment. Yet another advantage of the present invention is that the portable advisory system is a low cost tool for balancing airflows in a paint booth that does not require extra on-line control or sensing equipment. Still another advantage of the present invention is that the portable advisory system eliminates the time consuming, trial and error procedure currently used for balancing airflows in paint booths. A further advantage of the present invention is that the portable advisory system is easily transported and used by a single person. Yet a further advantage of the present is invention is that the portable advisory system has automatic data storage and transmittal from an airflow sensor to a computer. Still a further advantage of the present invention is that the portable advisory system automatically updates a simplified model of the airflows in a paint booth and uses this model to iteratively calculate the optimum adjustments to the fan speed and/or duct damper settings by minimizing the mean squared error between current and target airflows.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
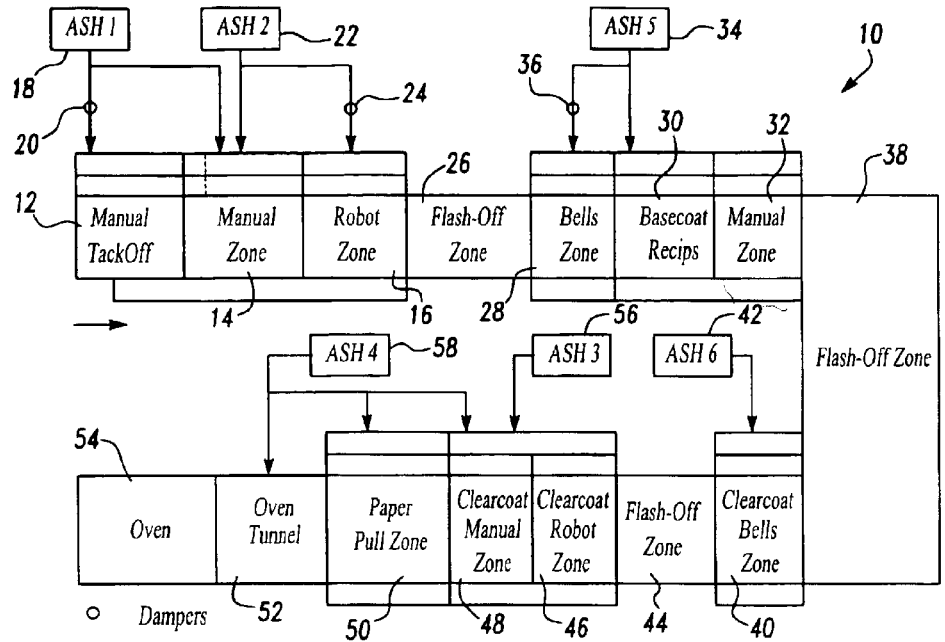
FIG. 1 is a diagrammatic view of a paint booth.

Referring to the drawings and in particular FIG. 1, one embodiment of a paint booth 10 is shown for painting a vehicle such as a motor vehicle (not shown). The paint booth 10 is represented as a nonlinear multivariable system with zero order dynamics in FIG. 2. The paint booth 10 includes a manual tack-off zone 12, a manual zone 14 adjacent the manual tack-off zone 12 and a robot zone 16 adjacent the manual zone 14. The paint booth 10 also includes a first air system handler 18 for handling airflow into the manual tack-off zone 12 and manual zone 14. The paint booth 10 also includes a damper 20 between the first air system handler 18 and the manual tack-off zone 12. The paint booth 10 also includes a second air system handler 22 for handling airflow into the robot zone 16 and manual zone 14. The paint booth 10 also includes a damper 24 between the second air system handler 22 and the robot zone 16. The paint booth 10 includes a flash-off zone 26 adjacent the robot zone 16. It should be appreciated that the manual tack-off zone 12 allows an operator to check for defects in the vehicle. It should also be appreciated that the flash-off zone 26 allows paint to settle on the vehicle. It should further be appreciated that the air system handlers 18 and 22 have fans mounted on a roof of the paint booth 10 that blow air from the ceiling to the floor of the zones as known in the art.

The paint booth 10 includes a bells zone 28 adjacent the flash-off zone 26, a basecoat recips zone 30 adjacent the bells zone 28 and a manual zone 32 adjacent the basecoat recips zone 30. The paint booth 10 also includes a third air system handler 34 for handling airflow into the bells zone 28 and the basecoat recips zone 30. The paint booth 10 includes a damper 36 between the third air system handler 34 and the bells zone 28. The paint booth 10 further includes a flash-off zone 38 adjacent the manual zone 32. It should be appreciated that the manual zone 32 allows an operator to manually touch-up the paint of the vehicle. It should also be appreciated that the flash-off zone 38 allows paint to settle on the vehicle. It should further be appreciated that the air system handler 34 has fans mounted on a roof of the paint booth 10 that blow air from the ceiling to the floor of the zones as known in the art.

The paint booth 10 includes a clearcoat bells zone 40 adjacent the flash-off zone 38. The paint booth 10 also includes a fourth air system handler 42 for handling airflow into the clearcoat bells zone 40. The paint booth 10 also includes a flash-off zone 44 adjacent the clearcoat bells zone 40. It should be appreciated that the flash-off zone 44 allows paint to settle on the vehicle. It should further be appreciated that the air system handler 42 has fans mounted on a roof of the paint booth 10 that blow air from the ceiling to the floor of the zones as known in the art.

The paint booth 10 includes a clearcoat robot zone 46 adjacent the flash-off zone 44, a clearcoat manual zone 48 adjacent the clearcoat robot zone 46 and a paper pull zone 50 adjacent the clearcoat manual zone 48. The paint booth 10 includes an oven tunnel zone 52 adjacent the paper pull zone 50 and an oven zone 54 adjacent the oven tunnel zone 52. The paint booth 10 also includes a fifth air system handler 56 for handling airflow into the clearcoat robot zone 46. The paint booth 10 further includes a sixth air system handler 58 for handling airflow into the clearcoat manual zone 48, paper pull zone 50 and oven tunnel zone 52. It should be appreciated that the air system handlers 56 and 58 have fans mounted on a roof of the paint booth 10 that blow air from the ceiling to the floor of the zones as known in the art. It should also be appreciated that the paint booth 10 is conventional and known in the art.

Figure 2:
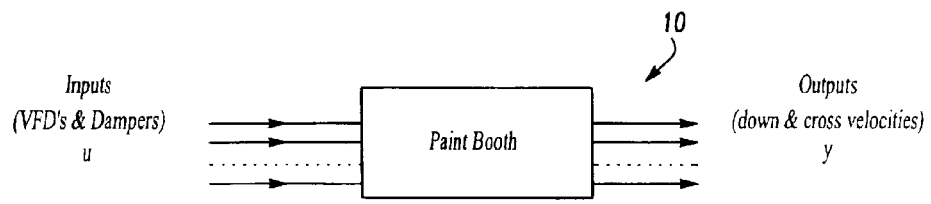
FIG. 2 is a block diagram of the paint booth of FIG. 1 illustrated as a multivariable system.

Referring to FIG. 2, the paint booth 10 is illustrated as a multivariable system with damper positions and fans VFDs as inputs, vector u, and down and cross velocities as outputs, vector y.

Figure 3:
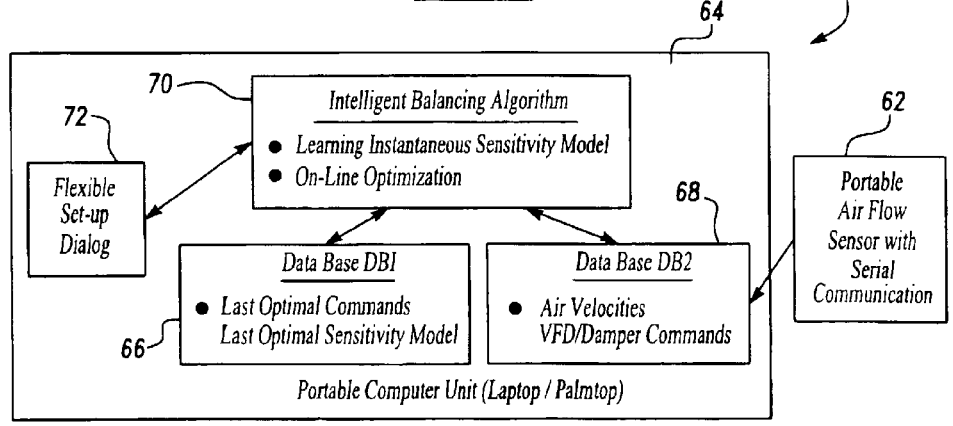
FIG. 3 is a block diagram of a portable advisory system, according to the present invention, for use with the paint booth of FIGS. 1 and 2.

Referring to FIG. 3, a portable advisory system 60, according to the present invention, is shown for use with the paint booth 10. The portable advisory system 60 includes an airflow sensor 62 and a main computer unit 64, both of which are portable. The airflow sensor 62 is portable and has a serial communication interface for communicating with the main computer unit 64. The airflow sensor 62 is of a handheld acoustic anemometer type. The airflow sensor 62 measures the cross and down velocities and communicates the measured data with the main computer unit 64. It should be appreciated that the airflow sensor 62 is conventional and known in the art.

The main computer unit 64 is a portable computer unit such as a laptop or palmtop computer. The main computer unit 64 has a memory, a processor, a display and a user input mechanism, such as a mouse or keyboard, as subsequently described. The main computer unit 64 contains a first database (DB1) 66 of information such as last optimal commands and last optimal sensitivity model to be described. The main computer unit 64 contains a second database (DB2) 68 of information such as air velocities and VFD/damper commands to be described. The main computer unit 64 also contains an algorithm 70 of a method, according to the present invention to be described, of balancing airflows in the paint booth 10. The algorithm 70 includes a learning instantaneous sensitivity model (J) and on-line optimization to be described. The algorithm 70 communicates with the first and second databases 66 and 68. The main computer unit 64 further includes a flexible set-up dialog 72 that communicates with the algorithm 70.

In operation, the portable airflow sensor 62 measures air velocities in the zones of the paint booth 10. After measuring all air velocities that are subject of adjustment, the portable airflow sensor 62 transmits the cross and down velocity data to the second database 68. The measured air velocities and the VFD's/Damper data that are associated with these measured values are passed to the algorithm 70. It should be appreciated that, except for the databases 66.and 68 and algorithm 70, the portable airflow sensor 62 and main computer unit 64 are conventional and known in the art.

Figure 4:
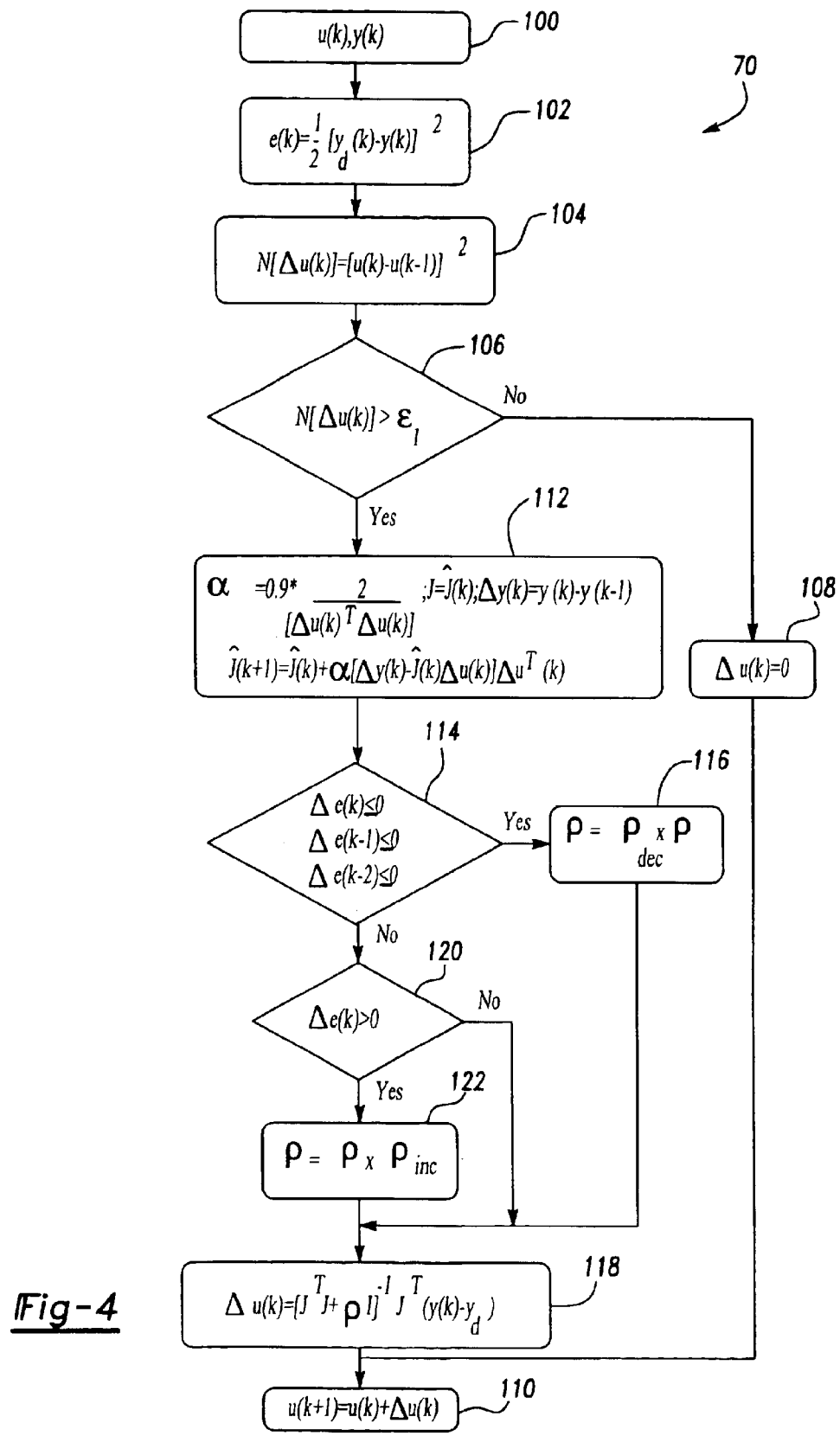
FIG. 4 is a flowchart of a method, according to the present invention, of balancing airflows in the paint booth of FIGS. 1 and 2 with the portable advisory system of FIG. 3.

Referring to FIG. 4, a flowchart of a method, according to the present invention, of the algorithm 70 is shown. The algorithm 70 updates a sensitivity model (J) of the paint booth 10. The sensitivity model (J) contains estimates of the matrix of the first partial derivatives of the velocities with respect to the VFD's/Dampers (input-output Jacobian). The Widrow-Hoff rule is used for leaning the Jacobian matrix rather than directly calculating the partial derivatives in order to eliminate the effect of noise. The flexible set-up dialog 72 includes user-friendly software that configures the portable advisory system 60 so it can be used in different paint booths 10. The first database 66 contains the last update of the sensitivity model (J) and last optimal VFD's and dampers' settings. The second database 68 contains the current VFD's and dampers' settings and the corresponding cross/down velocities.

After completing each set of velocity measurements, the algorithm 70 calculates a mean squared error (MSE) between the output velocity vector y and the vector of targets $y_d$. If the MSE is nonzero and a gradient of change of the input vector u exceeds a threshold constant, the sensitivity model (J) of the paint booth 10 is updated by using the Widrow-Hoff rule:

$$J(k+1)=J(k)+\alpha[\Delta y(k) -J(k)\Delta u(k)]\Delta u^T(k) \tag{1}$$

In the above expression, α stands for the rate of learning. This rate varies with an input autocorrelation matrix and opens/closes the sensitivity model (J) for learning based on the changes in the input signal or vector u:

$$\alpha = 0.9 * \frac{2}{[\Delta u(k)^T \Delta u(k)]} \tag{2}$$

The optimal change of the inputs or input vector u in direction of minimizing the MSE is calculated at each step by applying a modified version of the Levenberg-Marquardt optimization algorithm with a variable rate ρ:

$$\Delta u(k)=[J^TJ+\rho I]^{-1}J^T(y(k)-y_d) \tag{3}$$

The variable rate ρ controls the speed and robustness of the Levenberg-Marquardt optimization algorithm. For small ρ, the Levenberg-Marquardt optimization algorithm is fast, but less robust. For higher ρ, it is more robust, but converges slower. In the algorithm 70 of the present invention, the rate ρ is dynamically determined by the gradient of the MSE between the output vector y and the target vector $y_d$. If the MSE systematically decreases, which is an indication for a robust optimization process, the rate ρ is decreased vice versa. Feasibility of the new input vector update u:

$$u(k+1)=u(k)+\Delta u(k) \tag{4}$$

is checked by comparing with lower and upper limits and the elements that exceed the limits are replaced by the particular limits themselves. The new input values are placed in the second database 68 and displayed. These updated output values are manually applied as new VFD/damper settings. These new input values are used in the next adjustment of the inputs. The new inputs and the current sensitivity model (J) are stored in the first database 66 for further use. The purpose of the first database 66 is to save the last optimal input settings and the last sensitivity model (J) for a particular paint booth 10 so they can be used as initial conditions for starting the algorithm 70 every time a new balancing procedure starts.

In the present invention, the method starts in box 100 with the input vector u(k) and output vector y(k). The method advances to block 102 and calculates the sum-squared error (e), between the current outputs and their targets. The method then advances to block 104 and calculates the norm (N) of the change in the measure of the control signal ($\Delta u$). The method advances to diamond 106 and determines whether the norm (N) of $\Delta u$ is greater than a predetermined parameter ($\epsilon$). If not, the method advances to block 108 and sets a change of control $\Delta u$ equal to a zero value. The method then advances to block 110 and calculates the new input vector (u) according to equation (4) previously described. In this case, no change of control is made.

In diamond 106, if the norm of $\Delta u$ is greater than $\epsilon$, the method advances to block 112 and calculates the rate of learning ($\alpha$) according to equation (2) previously described. The method advances to diamond 114 and determines whether the change in error ($\Delta e$) is systematically less than or equal to zero. If so, the method advances to block 116 and increments parameter $\rho$. The method then advances to block 118 and calculates the change in the input signal according to equation (3). The method advances to block 110 previously described.

In diamond 114, if the change in error ($\Delta e$) is not systematically less than or equal to zero, the method advances to diamond 120 and determines whether the last change in error is greater than a zero value. If not, the method advances to block 118 previously described. If so, the method advances to block 122 and calculates parameter $\rho$. The method then advances to block 118 previously described.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A portable advisory system for balancing airflows in a paint booth comprising:
    a portable airflow sensor to measure airflows in the paint booth; and
    a portable computer connected to said airflow sensor for collecting data from said airflow sensor and guiding an operator through a process of adjusting multiple fan speeds and duct dampers to achieve desired airflows.

2. A portable advisory system as set forth in claim 1 wherein said portable computer includes a flexible set-up dialog.

3. A portable advisory system as set forth in claim 1 wherein said portable computer includes an algorithm communicating with a plurality of databases and a flexible set-up dialog.

4. A portable advisory system as set forth in claim 1 wherein said portable computer is a laptop computer.

5. A portable advisory system as set forth in claim 1 wherein said portable computer is a palmtop computer.

6. A method of balancing airflows in a paint booth, said method comprising the steps of:
    providing a portable airflow sensor to measure airflows in the paint booth;
    providing a portable computer and connecting, the portable computer to the air flow sensor;
    measuring the velocity of the airflows in the paint booth with the airflow sensor and storing the measured airflows in a database; and
    updating a sensitivity model (J) of the paint booth with the measured velocity of the airflows to balance the airflows in the paint booth.

7. A method as set forth in claim 6 including the step of updating new inputs and current sensitivity model in a first database.

8. A method as set forth in claim 6 including the step of calculating a rate of learning.

9. A method as set forth in claim 6 including the step of updating on-line the VFD and damper settings.

* * * * *